United States Patent [19]
Harriott et al.

[11] 3,986,324
[45] Oct. 19, 1976

[54] MELON PICKUP AND LOADING MACHINE

[76] Inventors: Billie Lee Harriott, 1084 Michelangelo Drive, Sunnyvale, Calif. 94087; Rodney B. Williams, No. 6 Brooks Farm, Higley, Ariz. 85236; Jerry A. Taylor, 600 West H. St., Dixon, Calif. 95620

[22] Filed: Jan. 9, 1975

[21] Appl. No.: 539,915

[52] U.S. Cl. ................................ 56/327 R; 56/328 R
[51] Int. Cl.² .................................... A01D 51/00
[58] Field of Search ............. 56/328 R, 327 R; 214/350–359

[56] References Cited
UNITED STATES PATENTS

| | | |
|---|---|---|
| 2,391,763 | 12/1945 | Anderson .......................... 56/364 |
| 2,441,244 | 5/1948 | Kimball ............................ 56/328 R |
| 2,515,966 | 7/1950 | Polisena ............................ 198/126 |
| 2,639,573 | 5/1953 | McLaughlin ...................... 56/328 R |
| 2,643,754 | 6/1953 | Doak ................................. 198/11 |
| 3,698,169 | 10/1972 | Simpson ........................... 56/328 R |
| 3,930,355 | 1/1976 | Bonham ........................... 56/327 R |

*Primary Examiner*—Russell R. Kinsey
*Attorney, Agent, or Firm*—Lothrop & West

[57] ABSTRACT

A machine for guiding melons from the ground onto lifting and distributing conveyors, having a fence for guiding melons along the ground toward a lift wheel which is rotating about a substantially horizontal axis, the wheel having flexible fingers extending radially therefrom to sweep the melons toward an upwardly inclined conveyor belt.

6 Claims, 12 Drawing Figures

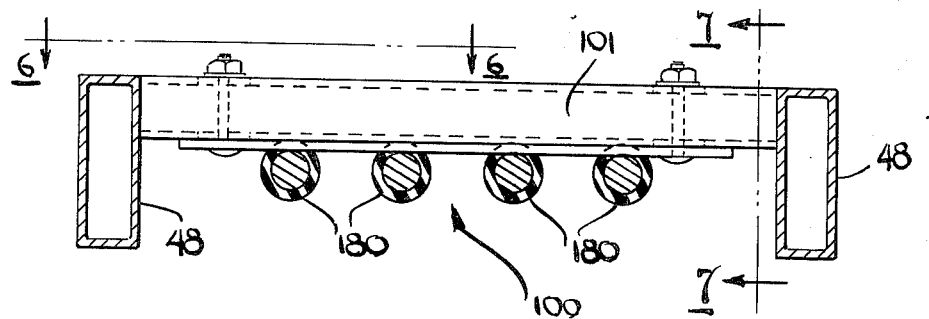
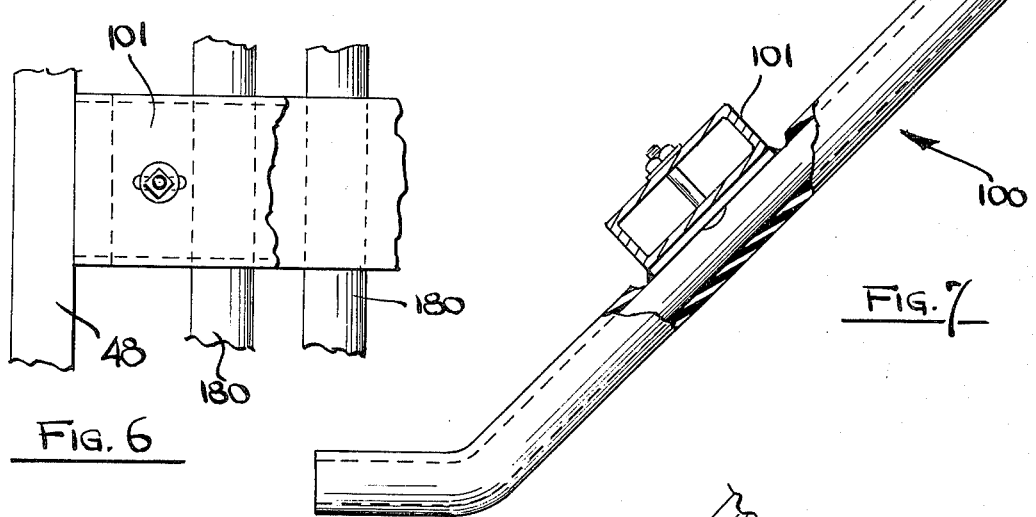
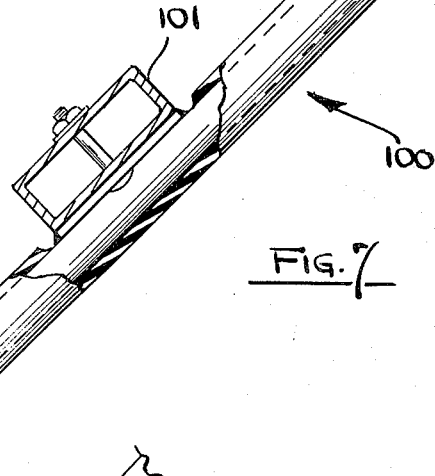
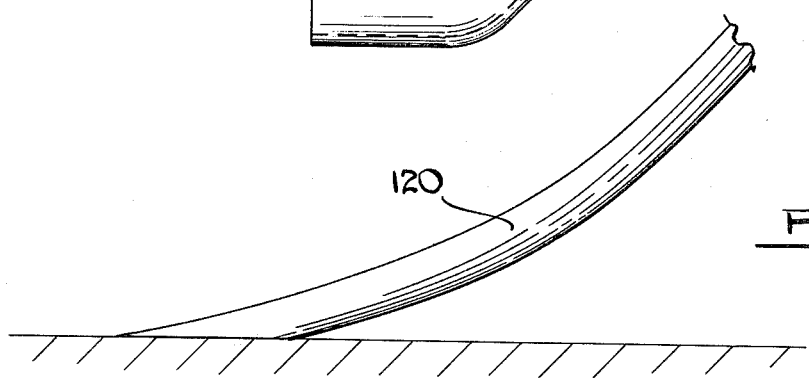
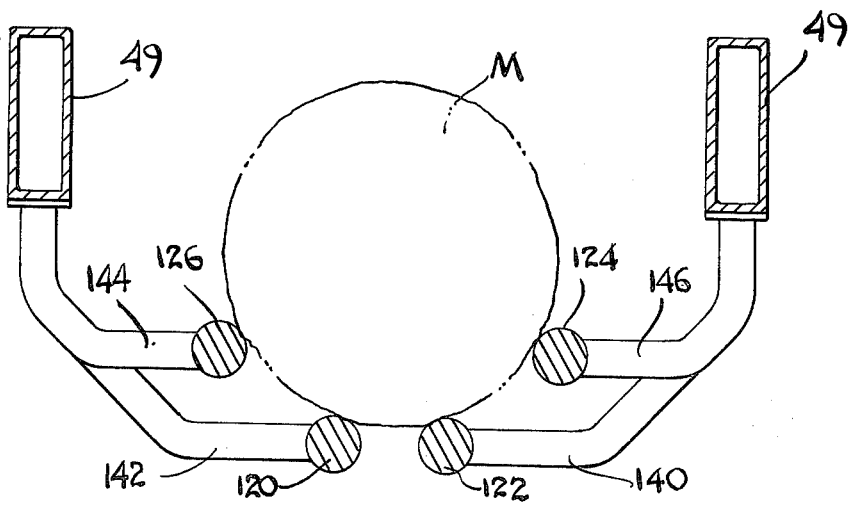

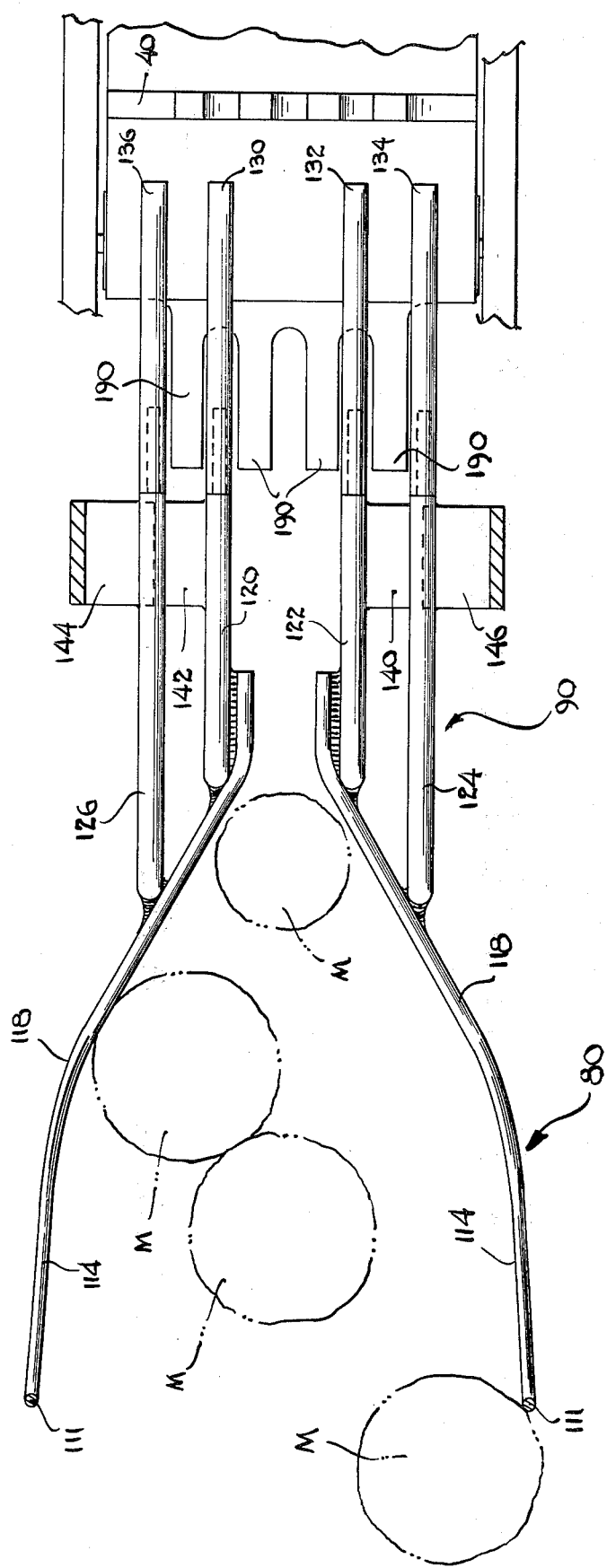

MELON PICKUP AND LOADING MACHINE

BACKGROUND OF THE INVENTION

This invention is an improvement upon an experimental machine which is described in an article entitled, "Mechanical Harvesting and Fruit Recovery of Cantaloupes" by B. L. Harriott and R. E. Foster II which was presented at the 1973 Annual Meeting of the American Society of Agricultural Engineers. It was published as paper No. 73-106.

In the paper is described a selective mechanical harvest apparatus for cantaloupes. Flexible rubber rods are used to comb ripe melons out of the vine area. A second machine uses a paddle wheel with rubber rods to sweep harvested melons onto an inclined conveyor for transport to bulk containers. The apparatus of this invention is an improvement upon the second machine.

The first machine was adapted to cause the melons to be delivered into the furrows. The second machine, upon which this invention is an improvement, may be designated as a machine which picks up melons from furrows and delivers them to other conveyor belts for loading into bins or trucks.

In that paper is described a paddle wheel arrangement with rubber rod fingers used to roll the melons up a series of inclined rods and onto an inclined belt conveyor equipped, preferably, with rubber flights. Peripheral speed of the paddle wheel was hydraulically controlled and was approximately twice ground speed. The inclined conveyor deposited the melons onto a horizontal side conveyor that carried them to the bulk container at the rear of the machine. The bulk container, typically, was lined with one inch foam rubber to prevent bruising of the fruit. Horizontal and inclined cross conveyors may replace the bulk container so that melons can be delivered directly to field trailers.

The entire unit was mounted on a standard farm tractor. All components were hydraulically driven.

BRIEF DESCRIPTION OF THE INVENTION

The apparatus of this invention is an improvement upon the apparatus described above.

The previously described apparatus had no means for guiding melons into engagement with the rubber fingers upon the ends of the spokes of the large horizontally axled lift wheel. Consequently the wheel needed to be aligned carefully or the machine would miss the melons.

Further, the wheel had no adjustment for various size melons.

The apparatus contemplated by this invention has a splayed melon fence which extends forward of the lift wheel and diverging from the wheel, whereby as the vehicle proceeds forward the diverging fence centers the melons in front of the lift wheel.

An up-down adjustment of the lift wheel allows the wheel more efficiently to accommodate various sized melons. By adjusting the height of the wheel for various sized melons, the fingers of the lift wheel do not damage the melons.

The conveyor flights may be closely spaced to the wheel by slotting the flights to clear the fingers.

The flexible fingers extending radially from the lift wheel are positioned in chucks which are fully covered by diapers or boots. The diapers prevent clogging of the chucks with dirt and vines, provide some stiffness to the fingers and prevent injury to the melons by the chucks.

The guide fence which guides the fruit toward the sweeping fingers of the lift wheel is preferably of rectangular cross-section which prevents riding over round fruits such as melons.

A series of bars, called "gathering bars" form a sloped channel up which the flexible fingers push the fruit. The gathering bars are separated to allow dirt, vines, and other debris to sift therebetween while still acting as a channel for the melons.

In the embodiment of this invention, the ends of the flexible tips of the lift wheel are mitred to prevent hard corner tip contact with fruit.

The above mentioned diapers or boots not only prevent clogging of the chucks which attach the flexible fingers to the spokes, but also shield the fruit from the hard portions of the spokes to prevent fruit damage.

In the embodiment of this invention, the lift wheel, except for the flexible fingers, is totally enclosed to prevent vine entanglement and trash build-up.

The apparatus of this invention also has a gage wheel which controls the up-down position of the spoked wheel to a substantially constant position above the ground. The gage wheel may be adjusted for various sized melons and field conditions.

The speed of the lift wheel may be automatically adjusted to gently roll and elevate the fruit under different field conditions and different fruit varieties.

It is therefore an object of this invention to pick up fruit.

It is a more specific object of this invention to pick up rounder fruit.

It is still a more specific object of this invention to pick up melons from the ground.

BRIEF DESCRIPTION OF THE DRAWINGS

Other objects will become apparent from the following description, taken in connection with the accompanying drawings.

FIG. 2 is an enlarged view, partly in section, taken at 2—2 in FIG. 1 and showing a channel of gathering bars for receiving fruit and filtering out vines, dirt and other debris.

FIG. 3 is an enlarged view, partly in section, taken at 3—3 in FIG. 1 and showing a barred barrier for preventing fruit from escaping the elevating conveyor.

FIG. 4 is an enlarged view, partly in section, taken at 4—4 in FIG. 1 showing a plan view of the gathering bars and splayed centering fence of the invention.

FIG. 6 is a view, taken at 6—6 in FIG. 3.

FIG. 7 is a view, partly in section, taken at 7—7 in FIG. 3.

FIG. 8 is a side view of one of the bars of the gathering bars of the invention.

DETAILED DESCRIPTION OF THE INVENTION

Figure 1:
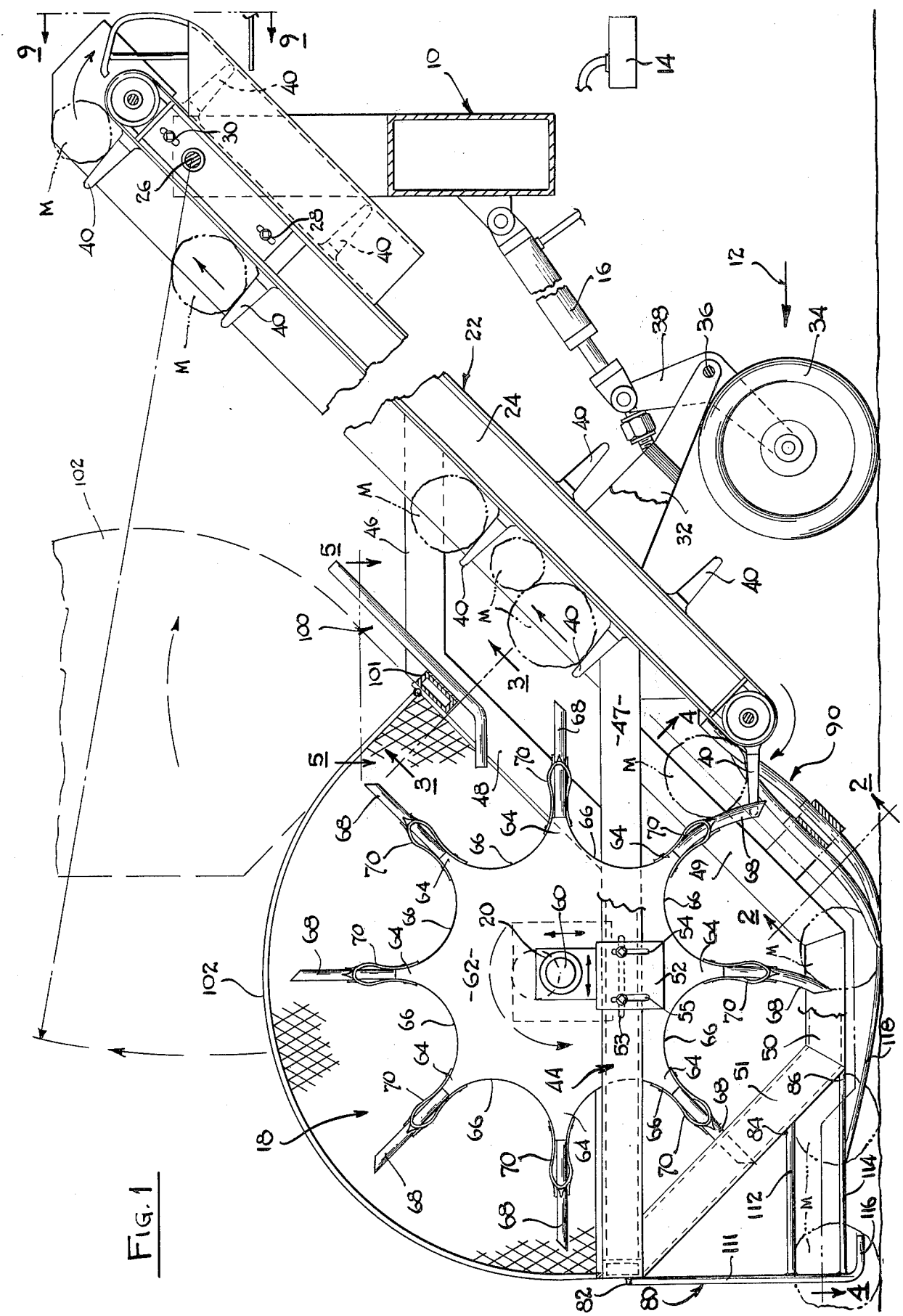
FIG. 1 shows a side elevation view of the apparatus of this invention, mounted upon a driving vehicle.

As appears in FIG. 1, a beam 10, or framework member, is mounted on the front end of a conventional vehicle, not shown, which moves forward in the direction of the arrow 12. The vehicle typically carries a prime mover such as an internal combustion engine (not shown) to drive wheels (not shown). A typical farm tractor is an example of the vehicle. The vehicle may also have a hydraulic pump and reservoir 14 which is adapted, through controls (not shown) to drive the actuator 16 and to drive the lift wheel 18.

The lift wheel 18 may be driven by an electric motor, hydraulic motor, pneumatic motor, or some other mechanical drive 20.

Typically an inclined conveyor belt 22 is mounted forward of the beam 10 upon a supporting frame 24. The frame 24 is pivoted on the beam 10 at a bearing 26 near the top of the conveyor belt 22. Some up-down adjustment of the frame 24 is allowed by slip joints 28, 30 which may be, for example, merely bolts with butterfly nuts for holding the adjusted position.

Depending from the frame 24 is an appendage 32 which is pivotably connected to a gage wheel 34. The gage wheel 34 is pivoted relative to the appendage 32 to adjust the height of the frame 24 about the pivot 36. The gage wheel 34 is levered relative to the pivot point 36, and the other end of the lever 38 is attached to a powered actuator 16. The actuator 16 delivers force between the framework member 10 and the lever 38 to raise or lower the frame 24.

The conveyor belt 22 has a plurality of slotted flights 40 which are described in more detail below.

Extending outward from the frame 24 is a truss-frame 44. The truss-frame 44 is cantilevered from the frame 24 by substantially horizontal links 46, 47 and reinforcing and supporting links 48, 49, 50, 51.

A bracket 52 is adjustable back and forth and up and down by slots 53, 54, 55. The bracket 52 supports the rotatable shaft 60 which is the shaft of the rotatable lift wheel 18. To support the wheel 18 properly, there are two frames 44, one supporting each end of the shaft 60. Only one frame 24 is shown in the figure.

The lift wheel 18 has a pair of end hub members 62 which may be a sheet of metal and which form a plurality of substantially uniformly distributed spokes 64. Only one of the end members 62 is shown in the figure. Extending along the wheel 18, substantially parallel to the shaft 60, are a plurality of curved covers 66 generally conforming to the contour of the end members to completely enclose the center of the wheel 18 to prevent vines and other debris from being tangled with the wheel 18. Where adjacent covers 66 are juxtaposed, at the spokes 64, openings are formed between the adjacent covers 66 to accommodate a plurality of flexible fingers 68. Details of the finger mountings will be discussed below in connection with FIGS. 10-12. Over the fingers 68 are slipped a plurality of cover means or boots 70, each having holes therein to allow the fingers 68 to extend therethrough while preventing vines, dirt and other debris from entering the wheel.

Forward of the wheel 18 is a splayed fence 80 which is splayed to sweep melons inward toward the wheel. Details of the fence 80 are described below in connection with FIG. 4. The fence is attached to the frame 44 as shown in FIG. 1 at 82, 84, 86.

To lift the melons from the ground, the flexible fingers 68 sweep the melons into a channel formed by the gathering bars 90 which are suspended from the link 49 of the frame 44 and which are inclined upwardly between the ground and the lower end of the conveyor belt 22. Details of the gathering bars 90 will be described in connection with FIGS. 2 and 4.

Above the conveyor belts are positioned a plurality of bars 100 to prevent the fruit from being thrown or escaping from the conveyor belt 22. The bars are supported from a crossbar 101 between the links 48 of the frames 44 on both sides of the apparatus.

Surrounding the entire moving wheel 18 is preferably a personnel guard 102 in the form of a screen.

FIG. 4 shows the details of the splayed fence 80. The link member 49, 50, 51 are not shown for clarity. The downstanding members 111 form the leading edge of the splayed fence 80. The members 111 are turned under at the bottom (see 116 in FIG. 1). The bend back is to avoid injuring or spearing the fruit. The bottom of the fence 80 is attached to the links 51 by members 112 and 114. A sloping member 118 rides along the ground. The member 118 curves inwardly toward the center of the lifting bars 90, and it is attached to 120, 122, 124 and 126 lifting bars. The bars 112, 114, 116, 118 may be made of metal, but they preferably are of soft material such as rubber or plastics. The bars 112, 114 first engage the fruit, but the fruit is then engaged by the bars 118 to guide it toward the center of the lifting bars 90.

The lifting bars 90 are shown particularly in FIGS. 2, 4 and 8. FIG. 8 shows an individual bar 120 from the side. The bars 120, 122 actually ride on or very near the ground. The bars 124, 126 are above the ground to form a channel for the fruit to ride in. The bars are curved at their lower end. At the upper end are flexible extensions 130, 132, 134, 136 for guiding the fruit onto the conveyor belt 22. The bars 120, 122, 124, 126 and the extensions 130, 132, 134, 136 are separated far enough apart that they fit into the flights of the conveyor belt and also avoid the flexible fingers of the rotating wheel 18.

The bars 120, 122, 124, 126 for gathering and lifting the melons may be of metal or of softer material such as rubber, leather or plastics material. The flexible end members 130, 132, 134, 136 ride on the belt 22. In an alternative embodiment the members 130, 132, 134, 136 could be of flexible material which is just rigid enough to hold itself off of the belt.

The bars 120, 122, 124, 126 are supported by cantilevered cross braces 140, 142, 144, 146 from links 49 of frame 44.

Figure 10:
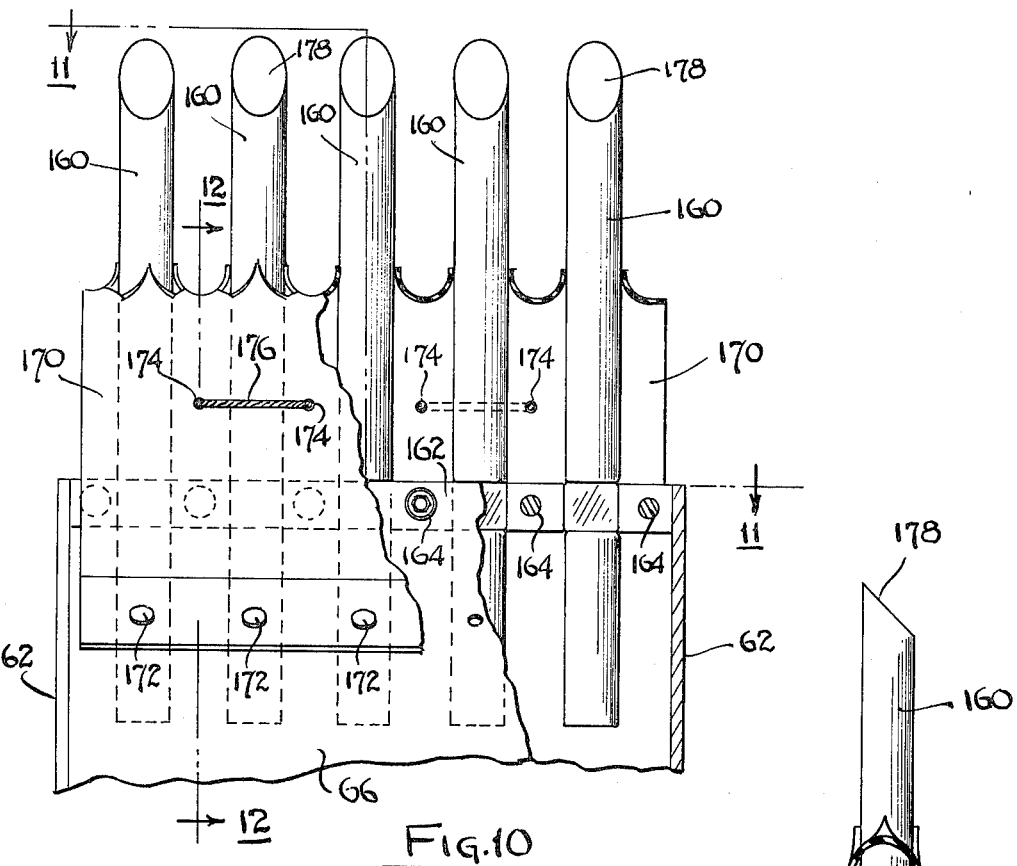
FIG. 10 is a view, partly in section, showing a plurality of flexible fingers secured on the lift wheel.
Figure 11:
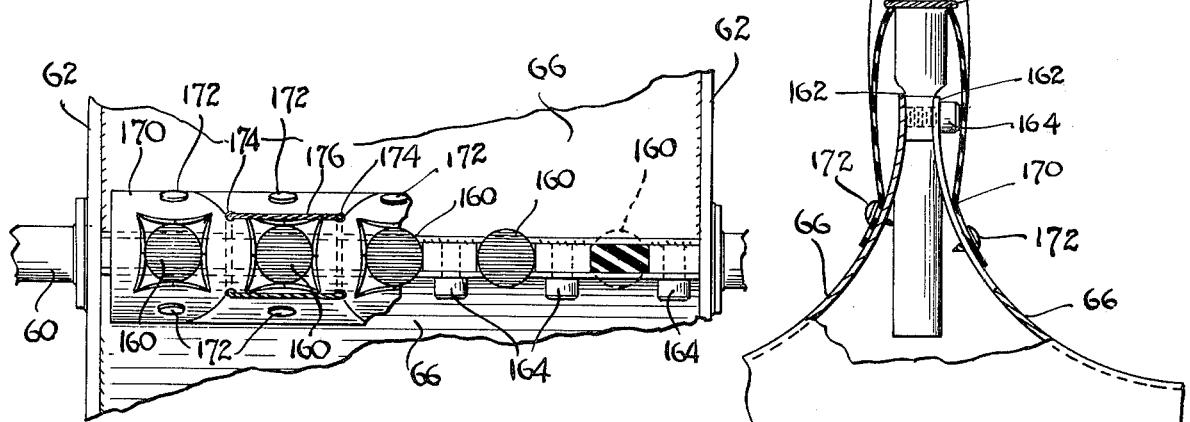
FIG. 11 is a view, partly in section, taken at 11—11 in FIg. 10.
Figure 12:
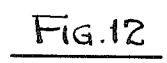
FIG. 12 is a view, partly in section, taken at 12—12 of FIG. 10.

Details of the wheel 18 and the flexible fingers are shown in FIGS. 10 through 12. The wheel 18 has a pair of end hubs 62, shown particularly in FIGS. 10 and 11, forming a web for the wheel. Between the end plates are curved enclosing sheets 66 positioned from one end plate to the other between the hubs 62. The end connection between adjacent ends of adjacent sheets 66 is shown in FIG. 12. The adjacent sheets 66 form a partial enclosure and mounting means for the tips 160, which are aligned in rows lying in the planes of the spokes 64.

The flexible tips 160 are a generally circularly cylindrical member, preferably of flexible material such as rubber. In the region of the spokes 64 a bolt 164 is screwed into threaded blocks 162 spaced between the adjacent tip or finger members 160 and the spaced end portions of sheets 66 to clamp the tip 160 therebetween. In the shown embodiment, five members 160 are arranged in a row between the adjacent members 66.

Over the member 160 in each row is slipped a flexible boot 170 which has a hole for each flexible tip 160 (in the shown embodiment there are five tips and five holes). The tips 160 fit through the holes. The bottom of the boot 170 is attached to the members 66 by screws 172 to form a substantially dirt-free joint.

In a preferred embodiment, holes are formed or pierced through the boot 170 as shown at 174 so that a cord 176 can be laced through the holes to draw the boot 170 close into the flexible fingers 160 as shown particularly in FIGS. 11 and 12.

The end 178 of the fingers 160 are shown beveled or mitred. In FIG. 1 the fingers are all shown mounted with the mitre in a particular direction. In actual practice the direction of the mitre can be random. The main purpose of the mitre is to prevent battering and piercing the fruit.

Figure 5:
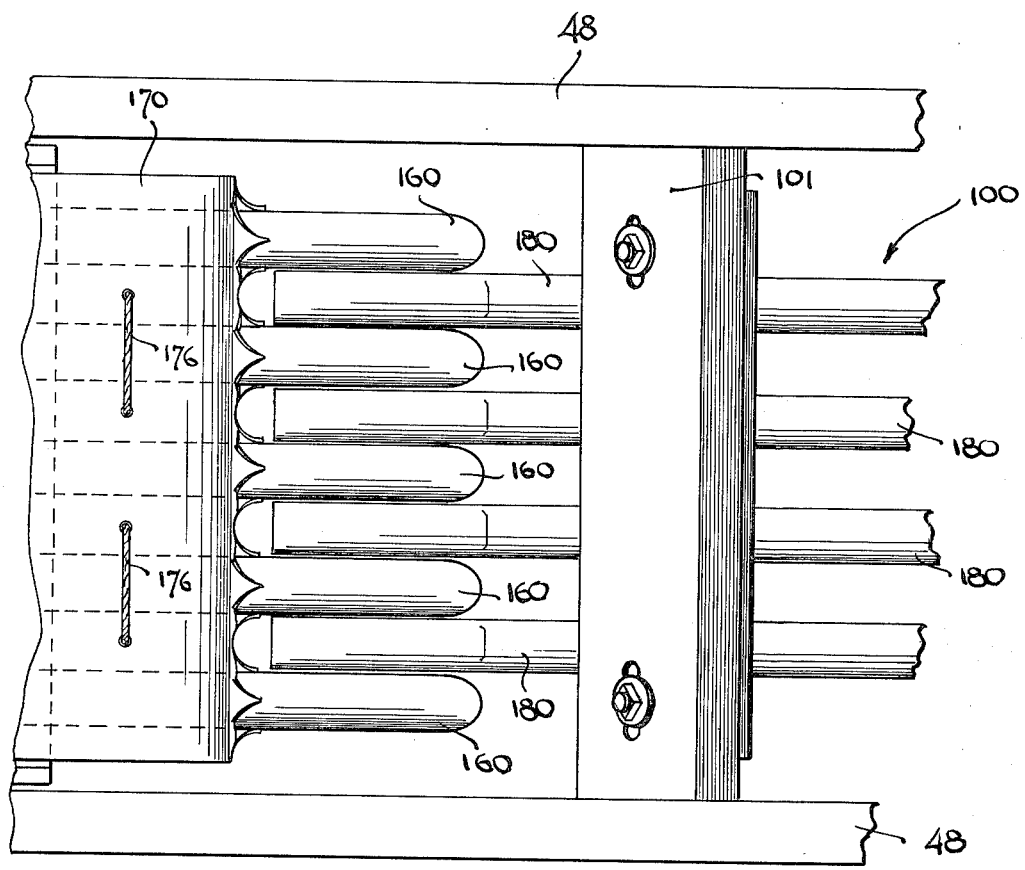
FIG. 5 is an enlarged view, partly in section, taken at 5—5 in FIG. 1 showing the interlacing of the barrier of FIG. 3 and the rotating lift wheel.
Figure 9:
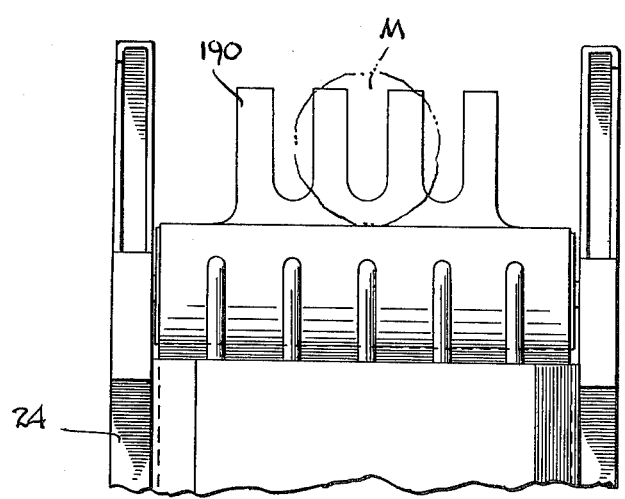
FIG. 9 is an end view of the lifting conveyer used with this invention, showing the slotted flights.

The melon guard 100 is positioned over the conveyor belt 22 to prevent the occasional throwing of a melon. As shown in FIGS. 3, 6, 7, a plurality of bar members 180 are positioned for support by a cross member 101. The bar members 180 are preferably covered with a rubber or soft coating as shown in FIG. 3 so that melons hitting the members 180 are not injured. The bars 180 are spaced apart just so that they fit into the spaces between the five flexible members 160 in each row on the wheel 18. The relative spacing is shown particularly in FIG. 5.

The conveyor belt 22 has a plurality of flights 40. Each flight 40 has a plurality of fingers 190 which are positioned apart to miss the bars 120, 122, 124, 126 and the end members attached thereto. The flights, particularly the fingers 190 are preferably made of soft material such as felt or rubber to avoid damaging the fruit.

In operation, the lift wheel 18 and the conveyor are preferably synchronized so that the flights 40 arrive to pick up the melons M as they are delivered to the belt 22.

As the machine carrying the framework beam 10, lift wheel 18 and conveyor 22 advances along its given path over the ground, the splayed members 114 of the fence 80 come into contact with the melons M, and the members 114 and 118 move the melons toward the center region of the gathering bars 90. The lift wheel 18 is preferably turning at a speed whereby the velocity of the fingers 160 relative to the vehicle is greater than the velocity of the vehicle over the ground, whereby the fingers 160 contact the melons M and push and lift them up the ramp formed by the gathering bars 90 in the channel between bars 120 and 122 onto the conveyor belt 22.

the boot 170 and the members 62, 66 prevent vines and debris from entering the wheel 18 and clogging it. They also stiffen the fingers and protect the fruit M.

The spacing between the gathering bars 90 prevent vines and dirt from being picked up by the fingers 160. Further, motion of the bars 118 over the ground give some lift to the bars and cause them to rise with hard dirt or clods rather than dig through the dirt.

The fruit is lifted by the conveyor belt to a height where it is placed into a bin (not shown) or delivered to another conveyor belt for further processing.

Thus, the apparatus of this invention is an improved lifter for fruit such as melons. It operates efficiently without serious clogging problems.

Although the invention has been described in detail above, it is not intended that the invention should be limited by that description but only by the description taken in combination with the appended claims.

We claim:
1. A machine for guiding fruit from the ground onto lifting and distributing conveyors comprising:
    a. a vehicle-supported frame movable forwardly along a given path over the ground;
    b. a lift wheel including a spaced pair of end hubs with radial spokes and a plurality of cover sheets extending between said hubs and substantially spanning adjacent spokes;
    c. means for mounting said lift wheel on said frame for rotation about a transverse horizontal axis;
    d. means connected to said lift wheel for rotating said wheel in a direction such as to move the lower part of said lift wheel rearwardly;
    e. a plurality of flexible radial spaced fingers arranged in rows lying in the planes of said radial spokes, the bases of said fingers being mounted on the adjacent ends of adjacent cover sheets, and the tips of said fingers on said lower part of said lift wheel engaging fruit on the ground and urging the fruit rearwardly as said lift wheel is advanced along said given path;
    f. a rearwardly and upwardly inclined conveyor carried on said frame with the lower forward end of said conveyor adjacent said lower part of said lift wheel, said conveyor including slotted flights interdigitating with said fingers to engage and elevate fruit urged rearwardly thereby;
    g. a fruit ramp mounted on said frame, said ramp sloping rearwardly and upwardly from a forward end adjacent the ground to engage and guide fruit propelled rearwardly by said fingers upwardly and rearwardly toward the after end of said ramp, said after end of said ramp being located adjacent said lower forward end of said conveyor; and,
    h. a fruit confining barrier mounted on said frame, said barrier including a plurality of parallel bars spaced above said conveyor in substantially parallel relation thereto and at a distance such as to hold within bounds the fruit impelled rearwardly and upwardly by said lift wheel, at least a portion of said bars being in interlaced relation with said fingers of said lift wheel to prevent the carry over of fruit beyond said barrier.

2. A machine as in claim 1 wherein said fruit ramp includes a plurality of parallel bars and said after end of said ramp is in interlaced relation with said slotted flights in the vicinity of said lower forward end of said conveyor.

3. A machine as in claim 2 including a rearwardly converging fruit gathering fence mounted on said frame, the forward divergent portion of said fence projecting ahead of said lift wheel adjacent ground level to gather fruit located on said path, the after convergent portion of said fence being located in the vicinity of the lowest portion of the arc of said fingers to direct fruit into the rearward sweep thereof.

4. A machine as in claim 3 in which said machine includes means for pivotally mounting said frame for vertical angular movement of said lift wheel and said fruit gathering fence in a downward direction toward the ground and in an upward direction away from the ground; and means for selectively moving said frame within limits in either of said directions of vertical angular movement.

5. A machine as in claim 4 in which said frame moving means includes a ground engaging wheel levered for tilting movement about a pivot on said frame; and actuator means connected to said wheel for controlling the extent of tilting movement of said wheel relative to said frame.

6. A machine as in claim 5 including a plurality of cover means enclosing the bases of said fingers to prevent the ingress of debris into the interior of said lift wheel defined by said pair of end hubs and said plurality of cover sheets.

* * * * *